US012202592B2

(12) United States Patent
Collado et al.

(10) Patent No.: US 12,202,592 B2
(45) Date of Patent: Jan. 21, 2025

(54) ELECTROMECHANICAL BLADE PITCH CONTROL

(71) Applicant: Textron eAviation Inc., Wichita, KS (US)

(72) Inventors: Paul C. Collado, Wichita, KS (US); Brian T. Cozine, Kechi, KS (US)

(73) Assignee: Textron eAviation Inc., Wichita, KS (US)

( * ) Notice: Subject to any disclaimer, the term of this patent is extended or adjusted under 35 U.S.C. 154(b) by 75 days.

(21) Appl. No.: 18/069,397

(22) Filed: Dec. 21, 2022

(65) Prior Publication Data

US 2023/0294818 A1   Sep. 21, 2023

Related U.S. Application Data

(60) Provisional application No. 63/292,577, filed on Dec. 22, 2021.

(51) Int. Cl.
*B64C 11/44* (2006.01)
*B64C 11/32* (2006.01)

(52) U.S. Cl.
CPC .............. *B64C 11/44* (2013.01); *B64C 11/32* (2013.01)

(58) Field of Classification Search
CPC ......... B64C 11/44; B64C 11/32; B64C 11/06; B64C 11/30; F01D 7/00
See application file for complete search history.

(56) References Cited

U.S. PATENT DOCUMENTS

| 3,487,880 | A | * | 1/1970 | Chilman | F04D 29/323 |
| | | | | | 416/157 R |
| 3,917,195 | A | * | 11/1975 | Oguri | B64C 11/30 |
| | | | | | 244/66 |
| 4,523,891 | A | | 6/1985 | Schwartz et al. | |
| 5,199,850 | A | | 4/1993 | Carvalho et al. | |
| 8,167,553 | B2 | | 5/2012 | Perkinson et al. | |
| 8,753,085 | B2 | | 6/2014 | Lovgren et al. | |
| 9,322,284 | B2 | * | 4/2016 | Liu | F03D 7/0224 |
| 9,677,408 | B2 | | 6/2017 | Tajan et al. | |
| 10,766,604 | B2 | | 9/2020 | Wergifosse | |
| 11,479,339 | B2 | | 10/2022 | Danielson | |

(Continued)

FOREIGN PATENT DOCUMENTS

EP          3501980 A1   6/2019

OTHER PUBLICATIONS

Extended European Search Report issued May 23, 2023 by the European Patent Office in corresponding European App. No. 22216155.6.

*Primary Examiner* — Courtney D Heinle
*Assistant Examiner* — Andrew Thanh Bui
(74) *Attorney, Agent, or Firm* — Avek IP, LLC

(57) ABSTRACT

An electromechanical pitch control system for modifying a collective blade pitch of a multi-blade propeller includes a pitch control rod mechanically coupled via a distal end to a plurality of blades of a propeller, a bearing assembly operatively connected to a proximal end of the pitch control rod, and an electric actuator operatively connected to the bearing assembly. The bearing assembly allows the electric actuator to remain stationary while the pitch control rod rotates with the propeller. The electric actuator is configured to translate the pitch control rod in a longitudinal direction for adjusting an incidence angle of the blades.

17 Claims, 6 Drawing Sheets

(56) References Cited

U.S. PATENT DOCUMENTS

| | | | |
|---|---|---|---|
| 11,807,354 B2* | 11/2023 | Zamponi | B64C 27/78 |
| 2013/0216380 A1* | 8/2013 | Liu | F01D 7/00 |
| | | | 416/23 |
| 2017/0247107 A1 | 8/2017 | Hauer et al. | |
| 2020/0331585 A1 | 10/2020 | Sartorius | |
| 2021/0139157 A1 | 5/2021 | Thompson et al. | |
| 2022/0111959 A1 | 4/2022 | Chando et al. | |
| 2022/0371721 A1* | 11/2022 | Boudebiza | B64C 11/40 |

* cited by examiner

ELECTROMECHANICAL BLADE PITCH CONTROL

CROSS-REFERENCE TO RELATED APPLICATIONS

This application claims the benefit of priority of U.S. Provisional Patent Application No. 63/292,577, entitled "Electromechanical Blade Pitch Control", and filed on Dec. 22, 2021, the disclosure of which is herein incorporated by reference in its entirety.

BACKGROUND

1. Field

Embodiments of the invention relate generally to propellers, and more specifically to propeller blade pitch control.

2. Related Art

Various solutions have been proposed for controlling the pitch of the blades of the propellers on turbomachines of the turboprop or "open rotor" turbo engine type. For example, U.S. Pat. No. 9,677,408 to Tajan et al. discloses a system for controlling the pitch of the blades of a turbo-engine. U.S. Patent Application Publication No. 2021/0206474 to Danielson discloses a propeller control system configured to monitor and change the pitch angles of the blades. U.S. Patent Application Publication No. 2020/0331585 to Sartorius discloses a rotor that includes an actuator connected to a controller that controls the pitch of the rotor blades.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In an embodiment, an electromechanical pitch control system for modifying a collective blade pitch of a multi-blade propeller includes an pitch control rod mechanically coupled via a distal end to a plurality of blades of a propeller, a bearing assembly operatively connected to a proximal end of the pitch control rod, and an electric actuator operatively connected to the bearing assembly. The bearing assembly allows the electric actuator to remain stationary while the pitch control rod rotates with the propeller. The electric actuator is configured to translate the pitch control rod in a longitudinal direction for adjusting an incidence angle of the blades.

In another embodiment, a pitch control system for adjusting a pitch of a propeller blade includes an electric motor operatively coupled with a propeller via a propeller shaft for rotating the propeller. The propeller shaft includes a hollow cylinder, and the electric motor includes a hollow portion. A rod is disposed within the propeller shaft and through the hollow portion of the electric motor. The rod is mechanically coupled to a variable-pitch blade of the propeller. An electrically powered actuator is mechanically coupled with the rod to move the rod in a longitudinal direction along a length of the rod for adjusting a pitch of the variable-pitch blade. A bearing assembly is configured to operatively couple the electrically powered actuator with the rod. The bearing assembly allows the actuator to remain stationary while the rod rotates with the propeller.

BRIEF DESCRIPTION OF THE DRAWING FIGURES

Embodiments of the invention are described in detail below with reference to the attached drawing figures, wherein.

Figure 1:
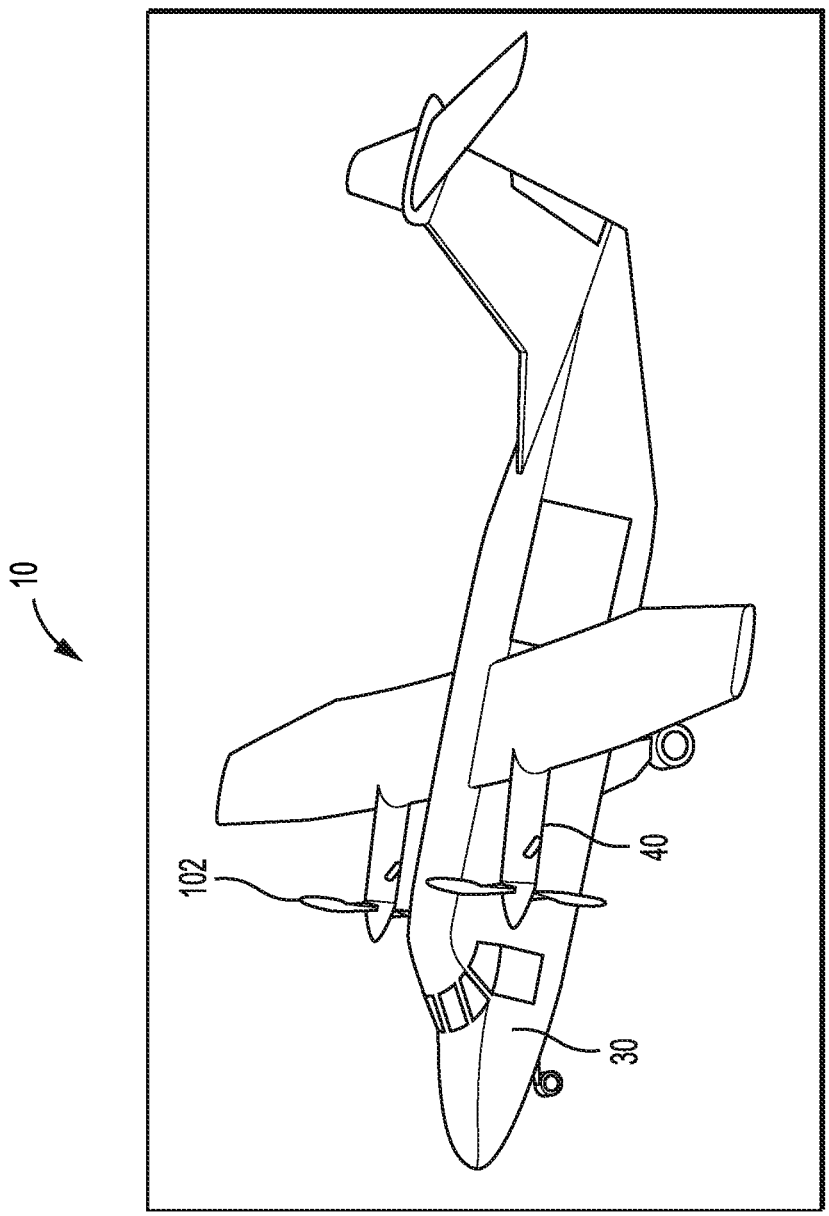
FIG. 1 is a diagram showing an embodiment of an aircraft having an electromechanical blade pitch control system.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Previous mechanisms of controlling aircraft propeller pitch typically incorporate hydraulic mechanisms. The use of hydraulic systems can, at times, require more routine maintenance and upkeep. Additionally, some hydraulic pitch control systems operate from the fore side of the propeller, requiring a bulkier, and potentially heavier, propeller. The present system aims to remedy these drawbacks and relates to an electromechanical system to control the incidence angle of one or more blades of a variable-pitch propeller. Furthermore, the system disclosed herein allows the blade pitch to be modulated in combination with electric motor torque to control propeller thrust while maintaining constant propeller speed.

FIG. 1 shows an aircraft 10 containing a cockpit 30 and an electric propulsion system 40. The aircraft 10 is propelled forwards by one or more electric propulsion systems 40. The electric propulsion system 40 may comprise, for example, a propeller mechanically coupled to an electric motor, where the electric motor is configured to rotate the propeller for providing thrust to the aircraft. In some embodiments, the aircraft 10 may comprise one or more electric propulsion systems 40. For example, aircraft 10 may include one, two, three four, or more electric propulsion systems 40. In some embodiments, the electric propulsion system 40 may comprise one or more electric rotors.

The electric propulsion system 40 includes one or more blades 102, whose movement is responsible for propelling the aircraft forwards. As such, many aspects of the blades 102 affect thrust of electric propulsion system 40 and flight characteristics of aircraft 10. For example, the angle of blades 102 may alter thrust and flight characteristics of aircraft 10. This includes the rotational angle of each individual blade 102 around the connection point to the propeller 104 (e.g., incidence angle β referenced in FIG. 5). Control of the pitch of blades 102 (e.g., by way of electromechanical blade pitch control system 100) allows for greater efficiency and control of the aircraft 10. In some embodiments, aircraft 10 may be a manned or unmanned aerial vehicle. While the electric propulsion system 40 is depicted here as a component of an aircraft (e.g., aircraft 10), it is contemplated that electric propulsion system 40 and corresponding blades 102 may be a component of other vehicles, such as a boat or helicopter.

Figure 2:
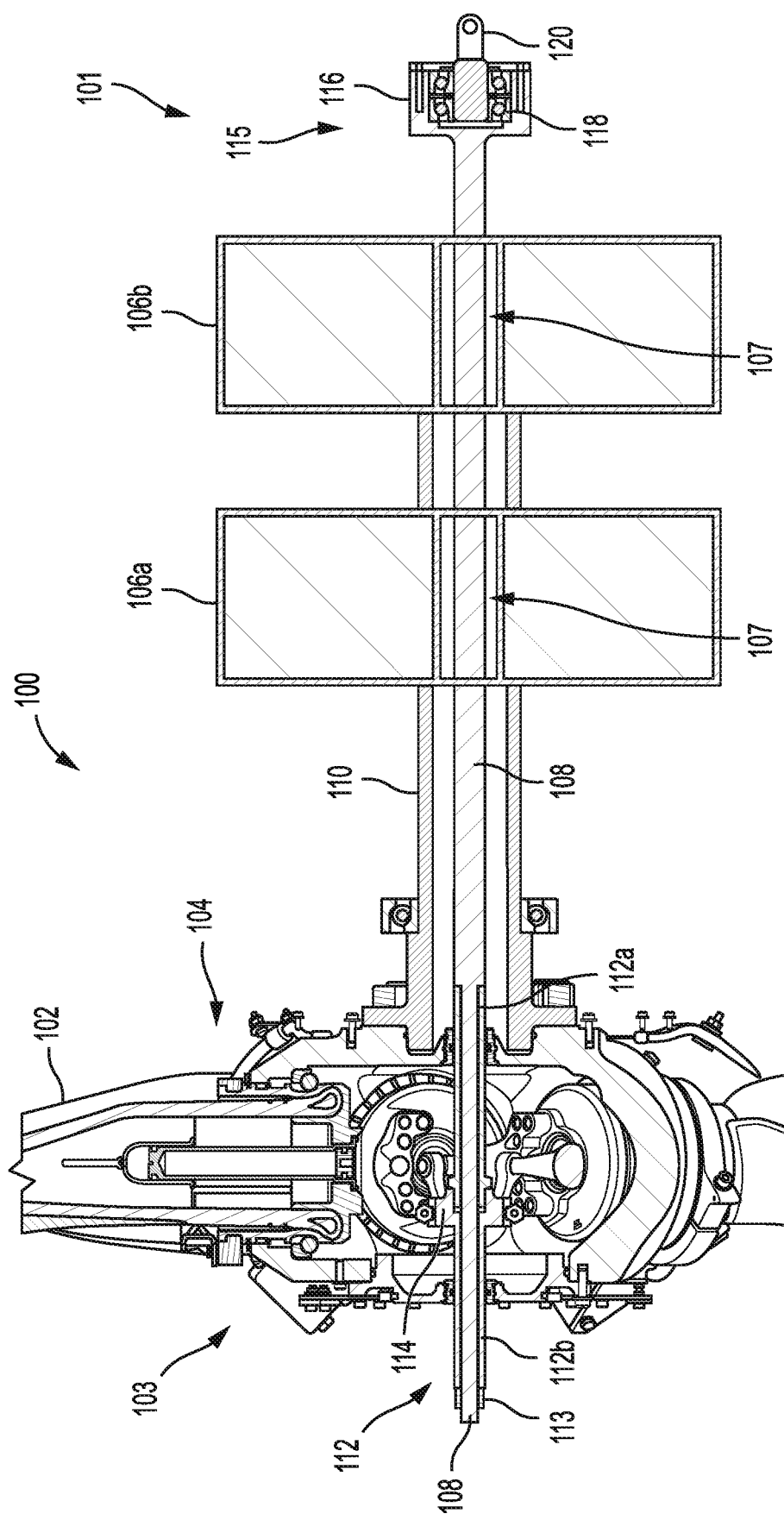
FIG. 2 illustrates a cross-sectional view of the electromechanical blade pitch control system in some embodiments.

FIG. 2 illustrates a cross-sectional view of an exemplary electromechanical blade pitch control system 100 configured for modifying a collective blade pitch of a multi-blade propeller. The electromechanical blade pitch control system 100 comprises a proximal section 101 and a distal section 103. In embodiments, proximal section 101 is aft and distal section 103 is forward with respect to the aircraft orientation. The electromechanical blade pitch control system 100 is configured to adjust the pitch of blades 102 on propeller 104. The propeller 104 may include a plurality of blades 102. Blades 102 and propeller 104 are configured to propel a vehicle in a specific direction. In some embodiments, if aircraft 10 comprises two or more electric propulsion system 40, electromechanical blade pitch control system 100 may be configured to independently adjust the pitch of blades 102 of each propeller 104.

In some embodiments, electromechanical blade pitch control system 100 may include one or more electric motors 106a, 106b. Electric motors 106a, 106b are configured to drive rotation of the blades 102 on propeller 104 via a propeller shaft 110. In some embodiments, propeller shaft 110 comprises a hollow cylinder configured to receive a pitch control rod 108 therein. Propeller shaft 110 is operatively coupled with electric motors 106a, 106b via any connection known to one skilled in the art (e.g., via gears). Electric motors 106a, 106b each comprise a hollow portion 107 configured for pitch control rod 108 to pass through.

Figure 4:
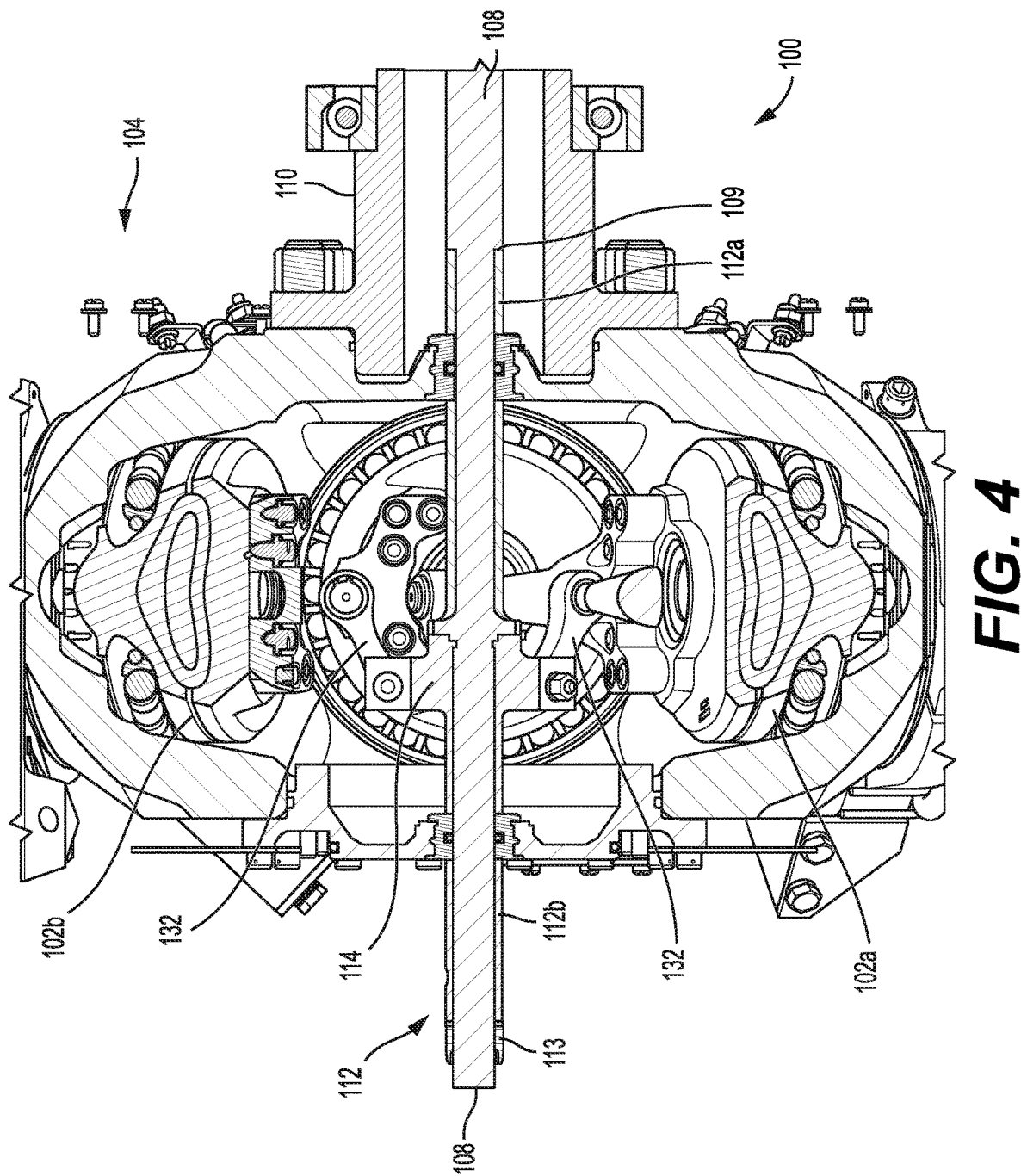
FIG. 4 illustrates a cross-section view of connective aspects of the distal components of the electromechanical blade pitch control system of FIG. 2, in some embodiments.

Pitch control rod 108, in some embodiments, comprises a solid elongated member made from a substantially rigid material (e.g., a metal or metal alloy). Pitch control rod 108 extends in the fore direction (i.e., towards propeller 104) through the propeller shaft 110. Propeller shaft 110 and electric motors 106a, 106 are configured to allow longitudinal translation of pitch control rod 108 therein (i.e., along the length of pitch control rod 108). For example, propeller shaft 110 and electric motors 106a, 106 both comprise a hollow portion that pitch control rod 108 passes therethrough. Pitch control rod 108 may mechanically couple with a beta control rod 112 at the proximal end 112a of pitch control rod 108. In embodiments, proximal end 112a threads into distal end 112b and then the two ends 112a, 112b are pinned together to prevent rotation therebetween. In some embodiments, proximal end 112a and distal end 112b are formed of a single piece of material. Connection of pitch control rod 108 to a proximal end 112a of beta control rod 112, rather than a distal end 112b as is commonly done, allows for the shortening of beta control rod 112 (see FIG. 4). In embodiments, beta control rod 112 comprises a hollow center portion that pitch control rod 108 passes through. A distal end of pitch control rod 108 comprises threads configured to receive a threaded nut 113. Beta control rod 112 comprises a collar 114 that extends radially around beta control rod 112. As described below in connection with FIGS. 4 and 5, collar 114 provides a mechanical connection point with beta control rod 112 for linkage to each of blades 102. In embodiments, proximal end 112a and distal end 112b are configured to slide onto the distal end of pitch control rod 108 during assembly. For example, pitch control rod 108 has a narrow portion at the distal end and a shoulder 109 such that proximal end 112a abuts against shoulder 109 as depicted in FIG. 4. Distal end 112b of beta control rod 112 is configured to abut against proximal end 112a, and nut 113 then tightens on the threaded end of pitch control rod 108 to secure beta control rod 112. Without departing from the scope hereof, beta control rod 112 may be formed of a single piece of material to provide a control collar configured for mechanically coupling with each blade 102 via a respective blade-angle control link 132.

Figure 5:
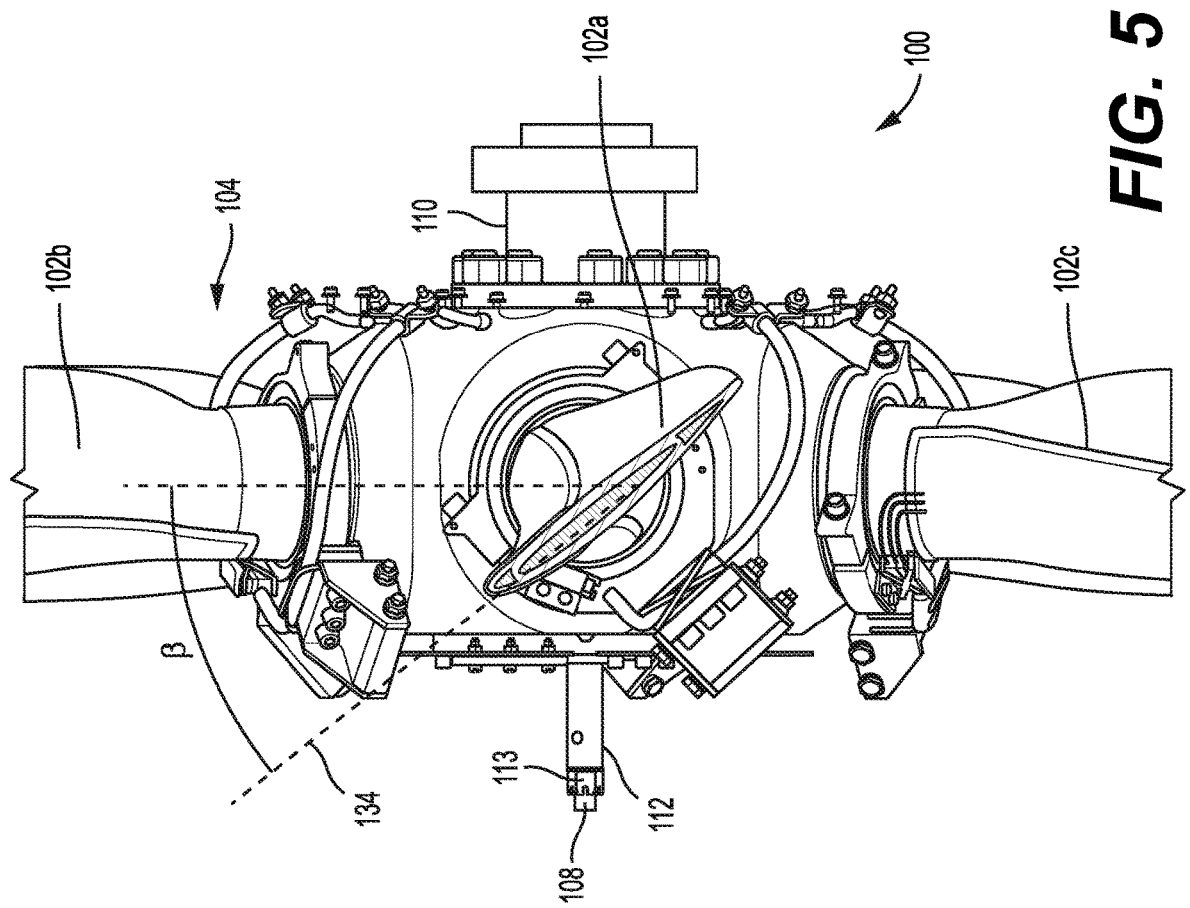
FIG. 5 illustrates an incidence angle of the blades of a propeller, in some embodiments.

In operation, beta control rod 112 allows for actuation of pitch control rod 108 to be translated to blades 102 via collar 114, therein affecting the pitch, or incidence angle β, of blades 102 (see FIG. 5). For example, actuation of pitch control rod 108 in the longitudinal direction may alter incidence angle β of blades 102 by moving beta control rod 112 and collar 114. This will be discussed in greater detail below with reference to FIGS. 4 and 5.

In some embodiments, pitch control rod 108 may be operatively connected to a bearing assembly 115 at the proximal end. Bearing assembly 115 may be configured to allow for portions of electromechanical blade pitch control system 100 to freely rotate while other portions remain substantially fixed along a rotational axis. For example, bearing assembly 115 may allow rotation of pitch control rod 108 while allowing an attachment lug 120 to remain fixed along the rotational axis. This is accomplished by a bearing housing 116 disposed at the proximal end of pitch control rod 108, which operatively engages one or more bearings 118. The bearings 118 allow for the bearing housing 116, and therefore pitch control rod 108, to rotate around attachment lug 120 when driven by electric motors 106a, 106b via propeller shaft 110. Decoupling the rotary movement of pitch control rod 108 from attachment lug 120 allows for an actuator (e.g., prop control actuator 122 illustrated in FIG. 3) to longitudinally drive movement of the pitch control rod 108 while remaining stationary along the rotational axis.

Figure 3:
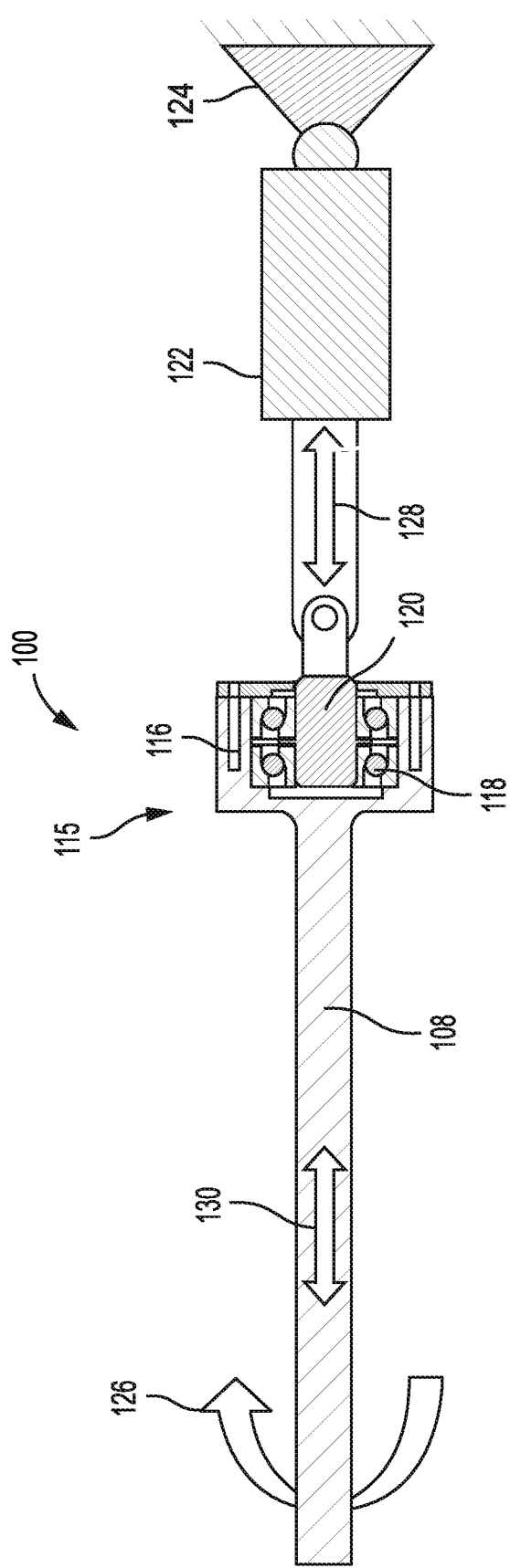
FIG. 3 illustrates a cross-sectional view of connective aspects of the proximal components of the electromechanical blade pitch control system of FIG. 2, in some embodiments.

Referring now to FIG. 3, proximally located components of electromechanical blade pitch control system 100 are illustrated. The proximal end of attachment lug 120 may connect to prop control actuator 122. In some embodiments, prop control actuator 122 is an electrically powered actuator. For example, prop control actuator 122 may be any one of a linear actuator, a rotary actuator, a piezo-electric actuator, a solenoid, or any other form of electric actuator known by one skilled in the art.

Prop control actuator 122 may be mechanically coupled at its proximal end to attachment point 124. Attachment point 124 may provide a fixed point of contact on the aircraft (e.g., to a structural member of an aircraft frame) that allows for prop control actuator 122 to translate in relation to (i.e., push or pull from). In some embodiments, attachment point 124 may be a structural member located inside the nacelle of an aircraft. In some embodiments, prop control actuator 122 may be configured to move in a substantially longitudinal direction (i.e., direction 128). Such movement may cause attachment lug 120 and bearing housing 116 to similarly move in the longitudinal direction. In this manner, translation of prop control actuator 122 will drive translation of pitch control rod 108 in the longitudinal direction (i.e., direction 130). Additionally, components of bearing assembly 115 simultaneously allow rotation of pitch control rod 108 (i.e., in direction 126). This rotation allows pitch control rod 108 to rotate with propeller 104 and blades 102.

Control of prop control actuator 122 may be accomplished by a variety of methods commonly known. For example, prop control actuator 122 may be controlled by one or more of a controller, a mechanical connection, an electrical connection, or others. In some embodiments, a connection between a controller (e.g., propulsion controller 204 of FIG. 6) may be one of a wired or a wireless connection. In cases where prop control actuator 122 is controlled by a controller, this control may be manual or automatic. In some examples, a user (e.g., a pilot or co-pilot) may input into the controller a specific desired angle of blades 102. In other examples, the controller may sense via inputs from one or more portions of the aircraft, that the pitch of blades 102 needs to be changed to perform a certain task of the aircraft (e.g., if the aircraft is taking off, the controller, via actuation of prop control actuator 122, may change the pitch of blades 102 to propel the aircraft forwards).

FIG. 4 shows a cross-sectional view of distal connective components of the electromechanical blade pitch control system 100. Additionally, FIG. 5 shows a blade pitch angle (i.e., incidence angle β) of blade 102a, which is adjusted via movement of the components illustrated in FIG. 4. It is noted that blade 102a in FIG. 5 is extending from propeller 104 towards the viewer, while blades 102b and 102c extend in alternative directions. Accordingly, FIGS. 4 and 5 are best viewed together with reference to the following description. As illustrated, the pitch control rod 108 is connected to the blades 102 of the propeller 104 via collar 114 of beta control rod 112. In some embodiments, collar 114 is operatively connected to a blade-angle control link 132. Blade-angle control link 132 may be mechanically attached to the inner portions of each blade 102 of propeller 104. Accordingly, and as described above with reference to FIG. 3, longitudinal adjustment of the pitch control rod 108 will, via collar 114 and blade-angle control link 132, adjust the incidence angle β of the blades 102 of propeller 104. For example, as shown in FIG. 4, collar 114 is moved left/right and blade-angle control links 132 translate the left/right motion to clockwise/counterclockwise rotation of blades 102. As shown in FIG. 5, incidence angle β is the angle established between blade chord line 134 and a substantially vertical plane. As briefly mentioned above, altering the incidence angle β of the one or more blades 102 of a propeller 104 may substantially impact motions of the aircraft 10. For example, incidence angle β establishes the force of blades 102 against the air. Generally, the greater the incidence angle β, the greater the thrust of propeller 104. Conversely, the lower the incidence angle β, the lower the thrust of propeller 104.

Figure 6:
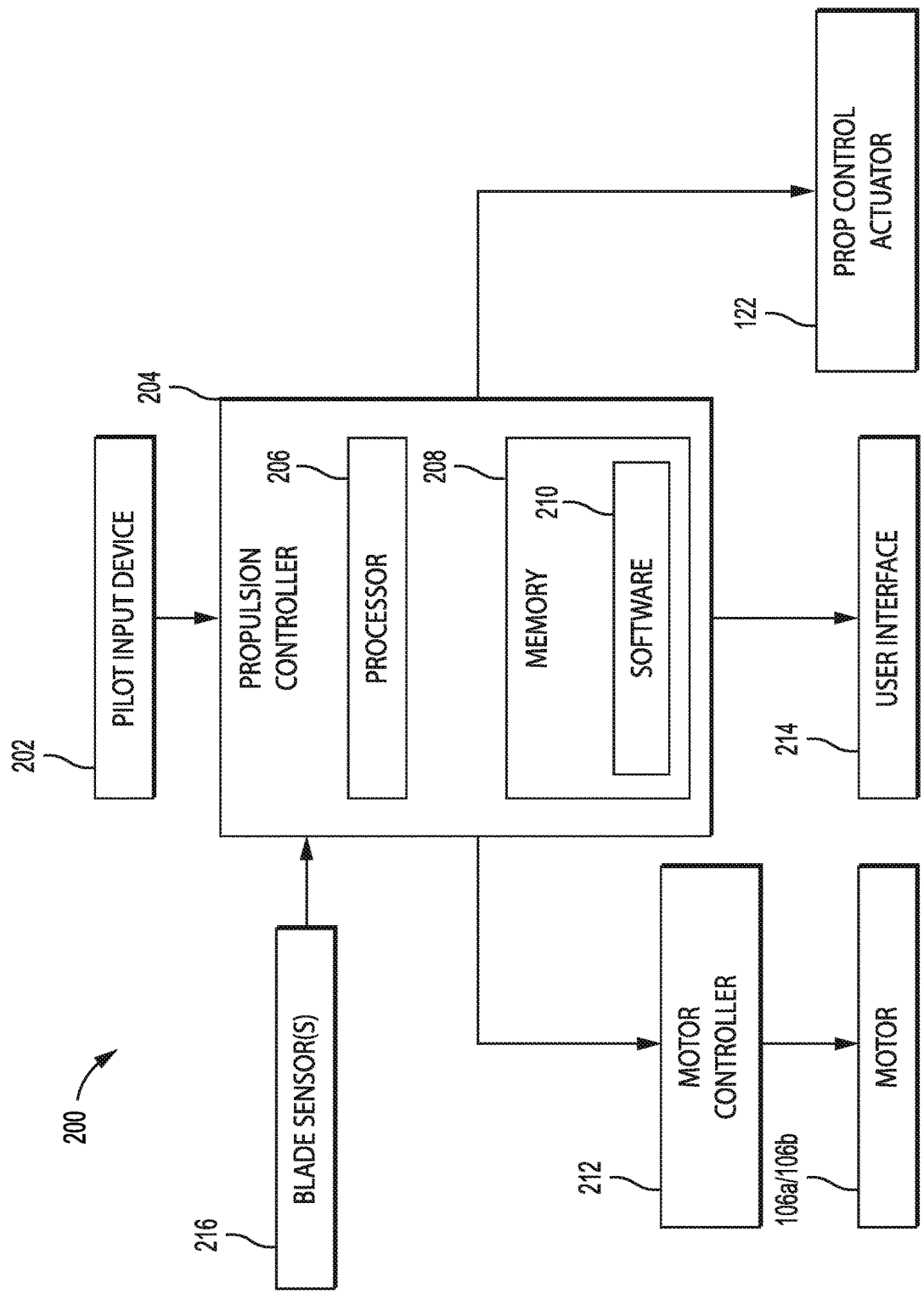
FIG. 6 is a block diagram illustrating a control architecture for controlling various components of the electromechanical blade pitch control system of FIG. 2, in some embodiments.

FIG. 6 is a block diagram illustrating an exemplary control architecture 200 for controlling various components of the electromechanical blade pitch control system 100. Control architecture 200 includes a pilot input device 202, which is operatively linked to a propulsion controller 204. A user may direct different actions of aircraft 10 using pilot input device 202. Pilot input device 202 may comprise one of a lever, a button, a pedal, a throttle, a joystick, a yoke, a control wheel, a center stick, a sidestick, etc. Based on actions associated with pilot input device 202, propulsion controller 204 may determine adjustments necessary to the incidence angle β of blades 102.

Propulsion controller 204 may be a microcontroller, a microprocessor, or programmable logic controller (PLC). In some embodiments, propulsion controller 204 may be a computer (e.g., an aircraft flight computer or separate computer), having a memory 208, including a non-transitory computer-readable medium for storing software 210, and a processor 206 for executing instructions of software 210 as known to one of skill in the art. In certain embodiments, some, or all of software 210 is configured as firmware for providing low-level control of devices of the electromechanical blade pitch control system 100. Communication between propulsion controller 204 and devices of electromechanical blade pitch control system 100 may be by one of a wired and/or wireless communication media.

In embodiments, a motor controller 212 is operatively coupled to electric motors 106a, 106b and communicatively coupled with propulsion controller 204. In some embodiments, blade sensors 216 may be used for determining the incidence angle β of blades 102 and providing data about the incidence angle β to propulsion controller 204. A user interface 214 may optionally be communicatively coupled with propulsion controller 204 for displaying information about the incidence angle β of blades 102 or other information from propulsion controller 204. For example, information regarding propeller pitch may be used for regulatory requirements or for maintenance purposes. Additionally, user interface 214 may be used to display information to the pilot when the propeller pitch angle has entered a potentially hazardous range during flight.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An electromechanical blade pitch control system for modifying a collective blade pitch of a multi-blade propeller, comprising:
    a pitch control rod having a proximal end opposite a distal end;
    a beta control rod disposed around a narrow portion of the pitch control rod, wherein the distal end of the pitch control rod is threaded and extends outwards from the beta control rod such that a threaded nut is configured to secure the beta control rod about the pitch control rod;
    a collar rigidly coupled to the beta control rod, wherein the collar is configured to operatively couple the beta control rod with a plurality of blade-angle control links for a adjusting a pitch of a respective plurality of blades of the multi-blade propeller;
a bearing assembly operatively connected to the proximal end of the pitch control rod; and
an electric actuator operatively connected to the bearing assembly,
wherein the bearing assembly allows the electric actuator to remain stationary while the pitch control rod rotates with the propeller, and
wherein the electric actuator is configured to translate the pitch control rod in a longitudinal direction for adjusting an incidence angle of the blades.

2. The electromechanical blade pitch control system of claim 1, wherein the electric actuator is mounted to a structure inside an aircraft nacelle.

3. The electromechanical blade pitch control system of claim 1, wherein the pitch control rod passes longitudinally through a hollow propeller shaft.

4. The electromechanical blade pitch control system of claim 3, comprising an electric motor configured to rotate the hollow propeller shaft for rotating the propeller, wherein the electric motor comprises a hollow portion configured for the pitch control rod to pass therethrough.

5. The electromechanical blade pitch control system of claim 1, wherein the electric actuator is an electrically-powered linear actuator.

6. The electromechanical blade pitch control system of claim 1, comprising a lug mechanically coupled to the electric actuator, wherein the bearing assembly comprises a bearing housing rotatably coupled to the lug via a plurality of bearings, such that the lug remains stationary while the bearing housing and the control rod rotate.

7. The electromechanical blade pitch control system of claim 1, wherein the pitch control rod extends aft of the propeller and the electric actuator is mechanically coupled to a structure aft of the control rod.

8. The electromechanical blade pitch control system of claim 1, wherein the pitch control rod comprises a solid elongated member made of a substantially rigid material.

9. A pitch control system for adjusting a pitch of a propeller blade, comprising:
an electric motor operatively coupled with a propeller via a propeller shaft for rotating the propeller, wherein the propeller shaft comprises a hollow cylinder and the electric motor comprises a hollow portion;
a rod disposed within the propeller shaft and through the hollow portion of the electric motor, wherein the rod is mechanically coupled to a variable-pitch blade of the propeller via a control collar;
an electrically powered actuator mechanically coupled with the rod, wherein the electrically powered actuator is configured to move the rod in a longitudinal direction along a length of the rod for adjusting a pitch of the variable-pitch blade;
wherein the electrically powered actuator is mechanically coupled to a proximal end of the rod, and a distal end of the rod comprises threads configured to receive a threaded nut for rigidly securing the control collar about the rod; and
a bearing assembly configured to operatively couple the electrically powered actuator with the rod, wherein the bearing assembly allows the actuator to remain stationary while the rod rotates with the propeller.

10. The pitch control system of claim 9, wherein the control collar comprises a blade-angle control link and the blade-angle control link mechanically couples the control collar with the variable-pitch blade such that a longitudinal translation of the rod via the electrically powered actuator translates to rotation of the variable-pitch blade.

11. The pitch control system of claim 10, wherein the control collar comprises a hollow center portion disposed around the rod and the rod extends through the control collar.

12. The pitch control system of claim 9, wherein the rod comprises a narrow portion having a shoulder, and the control collar is configured to abut against the shoulder.

13. The pitch control system of claim 12, wherein the control collar comprises a proximal extension configured to abut against the shoulder.

14. The pitch control system of claim 10, wherein the rod and the control collar comprise a single rigid piece that extends from the bearing assembly to the blade-angle control link of the propeller, thereby forming a direct connection between the bearing assembly and the blade-angle control link.

15. The electromechanical blade pitch control system of claim 1, wherein beta control rod and the control collar comprise a single rigid piece.

16. The electromechanical blade pitch control system of claim 15, wherein the pitch control rod passes through the beta control rod, and the distal end of the pitch control rod comprises threads, such that the beta control rod is secured to the pitch control rod via a threaded nut, thereby forming a direct connection between the bearing assembly and the propeller.

17. The electromechanical blade pitch control system of claim 8, wherein the solid elongated member is a single piece extending from the bearing assembly to the beta control rod, thereby forming a direct connection between the bearing assembly and the beta control rod.

* * * * *